United States Patent
Xu et al.

(10) Patent No.: US 12,381,636 B1
(45) Date of Patent: Aug. 5, 2025

(54) DUAL-BEACON ELECTRO-OPTICAL FUSION TERAHERTZ COMMUNICATION TRACKING AND AIMING SYSTEM AND METHOD

(71) Applicant: University of Electronic Science and Technology of China, Sichuan (CN)

(72) Inventors: Ziming Xu, Sichuan (CN); Hongxin Zeng, Sichuan (CN); Yaxin Zhang, Sichuan (CN); Ziqiang Yang, Sichuan (CN)

(73) Assignee: University of Electronic Science and Technology of China, Sichuan (CN)

( * ) Notice: Subject to any disclaimer, the term of this patent is extended or adjusted under 35 U.S.C. 154(b) by 0 days.

(21) Appl. No.: 18/894,858

(22) Filed: Sep. 24, 2024

(30) Foreign Application Priority Data

Apr. 10, 2024 (CN) .......................... 202410429752.3

(51) Int. Cl.
*H04B 10/90* (2013.01)
*H04B 10/112* (2013.01)
*H04B 10/50* (2013.01)

(52) U.S. Cl.
CPC ......... *H04B 10/90* (2013.01); *H04B 10/1123* (2013.01); *H04B 10/503* (2013.01)

(58) Field of Classification Search
None
See application file for complete search history.

(56) References Cited

U.S. PATENT DOCUMENTS

| 9,338,788 B2 * | 5/2016 | Britz .................. H04W 72/542 |
| 10,707,961 B2 * | 7/2020 | Turner ................. H04B 7/195 |

(Continued)

FOREIGN PATENT DOCUMENTS

| CN | 106253993 A | 12/2016 |
| CN | 115764302 A | 3/2023 |

(Continued)

OTHER PUBLICATIONS

Yuksel et al., Free-space-optical mobile ad hoc networks: Autoconfigurable building bocks, 2009 (Year: 2009).*

(Continued)

*Primary Examiner* — Jai M Lee
(74) *Attorney, Agent, or Firm* — The Sun IP Law

(57) ABSTRACT

The present disclosure a dual-beacon electro-optical fusion terahertz communication tracking and aiming system and method. The system comprising a transmitter and a receiver, the transmitter includes a transmitting antenna, a first control module, a first communication module, a first information acquisition module, a first image acquisition and processing module, a first beam emitting end and a first gimbal. The receiver includes a receiving antenna, a signal processing module, a second control module, a second communication module, a second information acquisition module, a second image acquisition and processing module, a second beam emitting end and a second gimbal. Based on the disclosure, by means of a laser beacon and a terahertz beacon, the transmitter and the receiver in the terahertz communication system perform adjustment and alignment in real time, such that it is ensured that the terahertz communication system still keeps stable communication during movement.

20 Claims, 2 Drawing Sheets

(56) References Cited

U.S. PATENT DOCUMENTS

| | | | | |
|---|---|---|---|---|
| 10,917,173 | B2* | 2/2021 | Kingsbury | H04B 7/18513 |
| 11,595,126 | B2* | 2/2023 | Danesh | H04B 10/1123 |
| 12,177,047 | B2* | 12/2024 | Lee | H04L 7/0008 |
| 2014/0248049 | A1* | 9/2014 | Saint Georges | H04B 10/1125 |
| | | | | 398/115 |
| 2023/0308180 | A1* | 9/2023 | Alouini | H04B 10/1123 |
| 2025/0141564 | A1* | 5/2025 | Miller | H04B 10/61 |

FOREIGN PATENT DOCUMENTS

| | | |
|---|---|---|
| CN | 117254858 A | 12/2023 |
| CN | 117713397 A | 3/2024 |
| CN | 117713951 A | 3/2024 |

OTHER PUBLICATIONS

Nadeem et al., Comparison of link selection algorithms for free space optics/radio frequency hybrid network, 2009 (Year: 2009).*
The first office action of counterpart CN application No. 2024104297523 issued on Oct. 10, 2024.
The grant notice of counterpart CN application No. 2024104297523 issued on Oct. 31, 2024.

\* cited by examiner

DUAL-BEACON ELECTRO-OPTICAL FUSION TERAHERTZ COMMUNICATION TRACKING AND AIMING SYSTEM AND METHOD

TECHNICAL FIELD

The disclosure relates to the technical field of terahertz communication, and particularly relates to a dual-beacon electro-optical fusion terahertz communication tracking and aiming system and method.

BACKGROUND

With the advantages of microwave communication and optical communication, a terahertz communication system can solve the problem of spectrum scarcity and capacity limitation of a current wireless communication system, and is one of the potential key technologies of 6G. Propagation of electromagnetic waves of a terahertz wave band in the atmosphere will be immensely attenuated, especially water vapor and oxygen molecules will absorb terahertz waves. In order to support ultra-high-rate data transmission, the terahertz communication system is required to have sufficient transmission power and desirable antenna directivity to keep stability of high-rate communication. Thus, the terahertz communication system will be equipped with an antenna having high directivity. In order to enable the terahertz communication system to have high mobility in a case of high directivity, how to enable a transceiver system of the terahertz communication system to still keep stable communication during movement becomes an urgent problem to be solved.

In the prior art, for example, patent CN 117713951 A discloses an optoelectronic terahertz communication system having an automatic alignment function and a communication method. A process of scanning and aligning an antenna is disclosed, but real-time mobile communication, that is, real-time tracking, pointing and dynamic adjustment cannot be achieved. Patent CN 102830714 B discloses an advanced pointing method in air-to-ground laser communication. Tracking according to a laser image position is disclosed, but the method relies only on a laser beacon, and a reference position cannot be dynamically adjusted. It can be seen that although the prior art discloses some alignment methods that can ensure communication, none of them can realize real-time tracking and adjustment in the field of terahertz communication and ensure that the terahertz communication system still keeps stable communication during movement.

SUMMARY

In order to solve the above problems in the prior art, the disclosure provides a dual-beacon electro-optical fusion terahertz communication tracking and aiming system, which can solve the problem that real-time tracking and adjustment cannot be realized in the field of terahertz communication and it cannot be ensured that the terahertz communication system still keeps stable communication during movement in the prior art.

A dual-beacon electro-optical fusion terahertz communication tracking and aiming system includes a transmitter and a receiver. The transmitter includes a transmitting antenna, a first control module, a first communication module, a first information acquisition module, a first image acquisition and processing module, a first beam emitting end and a first gimbal. The receiver includes a receiving antenna, a signal processing module, a second control module, a second communication module, a second information acquisition module, a second image acquisition and processing module, a second beam emitting end and a second gimbal.

The transmitting antenna, configured to transmit a terahertz signal, and the receiving antenna, configured to receive the terahertz signal.

The signal processing module, configured to process the received terahertz signal and input the received terahertz signal to the second control module.

The first communication module and the second communication module, configured for information interaction between the transmitter and the receiver.

The first information acquisition module, configured to acquire longitude and latitude information and inertial navigation information of the transmitter, and the second information acquisition module, configured to acquire longitude and latitude information and inertial navigation information of the receiver.

The first image acquisition and processing module, configured to acquire a receiver image and identify a centroid of a light beam emitted by the second beam emitting end, and the second image acquisition and processing module, configured to acquire a transmitter image and identify a centroid of a light beam emitted by the first beam emitting end.

The first control module, configured to receive and process information input by the first communication module, the first information acquisition module and the first image acquisition and processing module and issue a control instruction to the first gimbal.

The second control module, configured to receive and process information input by the signal processing module, the second communication module, the second information acquisition module, and the second image acquisition and processing module and issue a control instruction to the second gimbal.

In an embodiment, both the first image acquisition and processing module and the second image acquisition and processing module include an image acquisition unit and an image processing unit. The image processing unit, configured to process an image through binarization and Hough circle detection algorithm.

In an embodiment, the signal processing module includes a radio frequency logarithmic detection unit and an analog-to-digital conversion unit, wherein the radio frequency logarithmic detection unit and the analog-to-digital conversion unit are connected to each other.

In an embodiment, both the first communication module and the second communication module are Lora modules.

In an embodiment, both the first information acquisition module and the second information acquisition module include a Global Positioning System (GPS) unit and an Inertial Measurement Unit (IMU).

In an embodiment, both the first gimbal and the second gimbal are servo turntables.

In an embodiment, both the first beam emitting end and the second beam emitting end are laser emitters.

In an embodiment, the first control module and the second control module, configured to control the first gimbal to act and the second control module, configured to control the second gimbal to act, such that rapid alignment, preliminary alignment, and tracking and aiming of the transmitter and the receiver are sequentially achieved.

In an embodiment, the radio frequency logarithmic detection unit is connected to intermediate frequency output of the receiver by means of a radio frequency cable. The analog-to-digital conversion unit is connected to the radio frequency detection module by means of a radio frequency cable and is connected to the second control module.

In an embodiment, the first image acquisition and processing module includes a camera and RK3588. The camera is connected to RK3588, the RK3588 is in serial port communication with the first control module, and the RK3588, configured to acquire an image by means of the camera, identify a centroid of a laser beam, and transmit position information of the centroid of the laser beam to the first control module through a serial port. The first control module transmits a control instruction to the first gimbal through a Controller Area Network (CAN) interface to control the first gimbal to act.

A dual-beacon electro-optical fusion terahertz communication tracking and aiming method uses the dual-beacon electro-optical terahertz communication tracking and aiming system, the method including:

S1: acquiring longitude and latitude information and inertial navigation information of a transmitter by means of a first information acquisition module, inputting the longitude and latitude information and the inertial navigation information to a first control module, acquiring longitude and latitude information and inertial navigation information of a receiver by means of a second information acquisition module, and inputting the longitude and latitude information and the inertial navigation information to a second control module;

S2: using interaction between a first communication module and a second communication module, transmitting the longitude and latitude information of the transmitter to the receiver, and transmitting the longitude and latitude information of the receiver to the transmitter; combining, by the first control module, the longitude and latitude information of the transmitter and the receiver and the inertial navigation information of the transmitter, and controlling a first gimbal to act; combining, by the second control module, the longitude and latitude information of the transmitter and the receiver and the inertial navigation information of the receiver, and controlling a second gimbal to act; and completing rapid alignment;

S3: controlling the second gimbal to act by the receiver by means of the second control module, acquiring a terahertz signal power value input by a signal processing module, and controlling the second gimbal to rotate to a position at which a maximum power value is achieved; and controlling the first gimbal to act by the transmitter by means of the first control module, acquiring a terahertz signal power value recorded by the receiver by means of the first communication module, controlling the first gimbal to rotate to a position at which a maximum power value is achieved, taking a terahertz signal power value recorded by the receiver at this time as maximum power, and completing preliminary alignment;

S4: acquiring and processing a receiver image by the transmitter by means of a first image acquisition and processing module after adjustment in S3, acquiring coordinates of a centroid of a light beam emitted by a second beam emitting end as first tracking and aiming reference coordinates, acquiring and processing a transmitter image by the receiver by means of a second image acquisition and processing module, and acquiring coordinates of a centroid of a light beam emitted by a first beam emitting end as second tracking and aiming reference coordinates;

S5: acquiring and processing the receiver image in real time by the first image acquisition and processing module during real-time tracking of the transmitter and the receiver, acquiring the coordinates of the centroid of the light beam emitted by the second beam emitting end, comparing the coordinates of the centroid of the light beam emitted by the second beam emitting end with the first tracking and aiming reference coordinates to acquire a first offset, acquiring and processing the transmitter image in real time by the second image acquisition and processing module, acquiring the coordinates of the centroid of the light beam emitted by the first beam emitting end, comparing the coordinates of the centroid of the light beam emitted by the first beam emitting end with the second tracking and aiming reference coordinates to acquire a second offset;

S6: based on S5, acquiring, by the second control module, the terahertz signal power value input by the signal processing module, comparing the power value with the maximum power to acquire a power reduction condition, determining a first rotation angle and a second rotation angle by combining the power reduction condition with the inertial navigation information of the transmitter and the inertial navigation information of the receiver; and S7: controlling, by the first control module, the first gimbal to rotate based on the first offset and the first rotation angle, and controlling, by the second control module according to the second offset and the second rotation angle, the second gimbal to rotate until a terahertz signal power value acquired by the receiver is equal to a maximum power value.

In an embodiment, S3 includes:

controlling, by the second control module, the second gimbal to move for transverse scanning, recording a terahertz signal power value at each position, completing the scanning, and moving the second gimbal to a position at which a maximum power value is achieved; controlling, by the second control module, the second gimbal to move for longitudinal scanning, and moving the second gimbal to a position at which a maximum power value is achieved;

controlling, by the first control module, the first gimbal to move for transverse scanning, transmitting, by the second control module, an acquired power value to the first control module, recording, by the first control module, a terahertz signal power value at each position, and controlling the first gimbal to move to a position at which a maximum power value is achieved;

controlling, by the first control module, the first gimbal to move for longitudinal scanning, moving the first gimbal to a position at which a maximum power value is achieved, and taking a power value acquired by the second control module at this time as a maximum power value.

In an embodiment, S4 includes:

completing the preliminary alignment by the receiver and the transmitter after S3, acquiring a frame of receiver image by the transmitter by means of the first image acquisition and processing module, binarizing the frame of receiver image, setting a gray value of a pixel point on the frame of receiver image as 0 or 255 based on a set threshold to highlight an outline of a light spot of a laser beam, carrying out a Hough circle detection algorithm on a binarized image to acquire a centroid and the outline of the light spot of the laser beam emitted by the second beam emitting end, and taking coordinates of a identified centroid as the first tracking and aiming reference coordinates; and acquiring the second tracking and aiming reference coordinates by the receiver.

In an embodiment, S6 includes: mapping an antenna pattern by the transmitter by taking a position at which maximum power is achieved as a center, determining a real-time power reduction gradient direction by the first control module according to the inertial navigation information of the transmitter and the receiver, determining a movement distance based on reduced power, and determining the first rotation angle comprehensively; and determining the second rotation angle by the receiver.

A dual-beacon electro-optical fusion terahertz communication tracking and aiming method includes carrying out rapid alignment of a transmitter and a receiver by means of longitude and latitude information and inertial navigation information of the transmitter and the receiver, carrying out preliminary alignment of the transmitter and the receiver according to a terahertz signal power value received by the receiver, taking terahertz signal power when the preliminary alignment is completed as maximum power, transmitting light beams by the transmitter and the receiver simultaneously, and determining first tracking and aiming reference coordinates and second tracking and aiming reference coordinates by the transmitter and the receiver by means of centroids of the light beams;

determining a first offset by the transmitter based on real-time data and maximum power during real-time tracking and aiming, determining a first rotation angle based on the real-time data and the first tracking and aiming reference coordinates, adjusting a direction according to the first offset and the first rotation angle, determining a second offset by the receiver based on the real-time data and the maximum power, determining a second rotation angle based on the real-time data and the second tracking and aiming reference coordinates, and adjusting a direction based on the second offset and the second rotation angle.

In an embodiment, the preliminary alignment includes moving the receiver for transverse scanning, recording a terahertz signal power value at each position, and moving, after the scanning is completed, the receiver to a position, at which a maximum power value is achieved, in a transverse direction; moving the receiver for longitudinal scanning, and moving the receiver to a position, at which a maximum power value is achieved, in a longitudinal direction; carrying out transverse scanning by the transmitter, recording a terahertz signal power value at each position, and moving the transmitter to a position, at which a maximum power value is achieved, in a transverse direction; moving the transmitter for longitudinal scanning, and moving the transmitter to a position, at which a maximum power value is achieved, in a longitudinal direction; and taking a power value acquired by the receiver at this time as a maximum power value.

In an embodiment, the double-beacon tracking and aiming method for photonic-electronic converging terahertz communication includes acquiring a frame of receiver image by the transmitter, binarizing the frame of receiver image, setting a gray value of a pixel point on the frame of receiver image as 0 or 255 based on a set threshold to highlight an outline of a light spot of a light beam, carrying out a Hough circle detection algorithm on a binarized image to acquire a centroid and the outline of the light spot of the light beam emitted by the receiver, and taking coordinates of a identified centroid as the first tracking and aiming reference coordinates; and acquiring the second tracking and aiming reference coordinates by the receiver.

In an embodiment, acquiring the first offset and the second offset includes acquiring and processing, by the transmitter, a receiver image in real time to acquire coordinates of the centroid of the light beam emitted by the receiver, comparing the coordinates with the first tracking and aiming reference coordinates to acquire the first offset, acquiring and processing, by the receiver, a transmitter image in real time to acquire coordinates of the centroid of the light beam emitted by the first beam emitting end, comparing the coordinates with the second tracking and aiming reference coordinates to acquire the second offset.

In an embodiment, a process of acquiring the first rotation angle and the second rotation angle includes: mapping an antenna pattern by the transmitter by taking a position at which maximum power is achieved as a center, determining a real-time power reduction gradient direction based on the inertial navigation information of the transmitter and the receiver, determining a movement distance based on reduced power, and determining the first rotation angle comprehensively;

mapping an antenna pattern by the receiver by taking a position at which maximum power is achieved as a center, determining a real-time power reduction gradient direction according to the inertial navigation information of the transmitter and the receiver, determining a movement distance based on reduced power, and determining the second rotation angle comprehensively.

In an embodiment, rapid alignment includes acquiring, by the receiver, the longitude and latitude information of the transmitter, acquiring, by the transmitter, the longitude and latitude information of the receiver, acting, by the transmitter, according to the longitude and latitude information of the transmitter and the receiver and the inertial navigation information of the transmitter, acting, by the receiver, based on the longitude and latitude information of the transmitter and the receiver and the inertial navigation information of the receiver, and completing the rapid alignment.

Beneficial effects of the disclosure are as follows:

According to the disclosure, the same tracking and aiming of terahertz communication is achieved by means of double beacons, and the double beacons mainly involve a laser beacon and a terahertz power beacon. A laser beacon of an input video stream is recognized through an image recognition algorithm, and position information of a center of the laser beacon in an image is acquired. Circle detection is carried out through Hough transform after image binarization. The terahertz power beacon is a received power value detected by connecting a radio frequency detection module to an analog-digital conversion module. Alignment of a transceiver system for terahertz communication can be accurately achieved by means of the terahertz power beacon, and accurate position reference coordinates are provided for the laser beacon. During real-time tracking and aiming of the laser beacon, whether the tracking and aiming are accurate can be determined by comparing a theoretical value obtained through a terahertz channel estimation algorithm with the terahertz beacon.

DETAILED DESCRIPTION OF THE EMBODIMENTS

In order to make objectives, methods and advantages of examples of the disclosure clearer, methods in examples of the disclosure will be clearly and completely described below in combination with accompanying drawings in the examples of the disclosure. Apparently, the described examples are some examples rather than all examples of the disclosure. Therefore, the following detailed descriptions of examples of the disclosure provided in accompanying drawings are not intended to limit the scope of the claimed disclosure, but are merely representative of selected examples of the disclosure. On the basis of examples of the disclosure, all other examples obtained by those of ordinary skill in the art without making creative efforts fall within the scope of protection of the disclosure.

The embodiment of the disclosure will be described in detail below in combination with FIG. 1.

Figure 1:
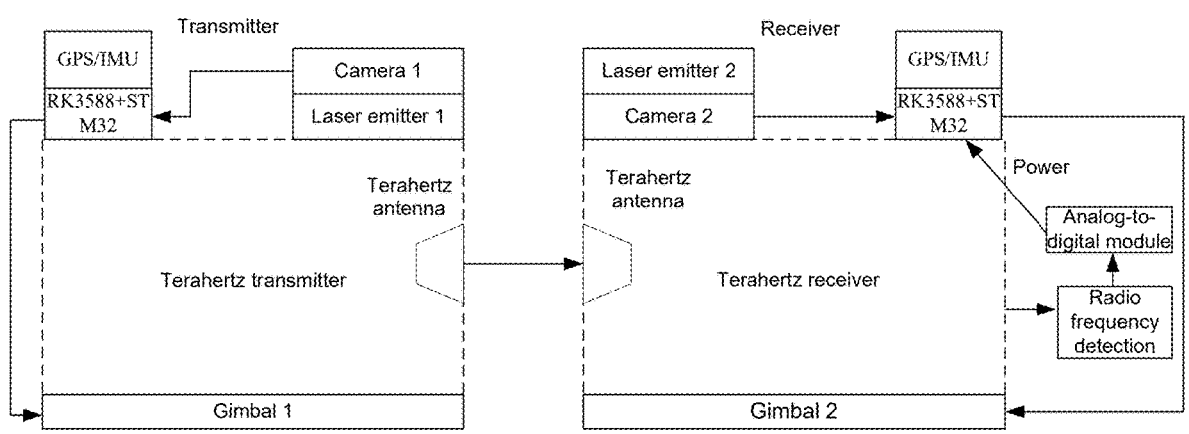
FIG. 1 is a schematic structural diagram of a dual-beacon electro-optical fusion terahertz communication tracking and aiming system according to some embodiments of the present disclosure.

A dual-beacon electro-optical fusion terahertz communication tracking and aiming system, as shown in FIG. 1, includes a transmitter and a receiver. The transmitter includes a transmitting antenna, a first control module, a first communication module, a first information acquisition module, a first image acquisition and processing module, a first beam emitting end and a first gimbal. The receiver includes a receiving antenna, a signal processing module, a second control module, a second communication module, a second information acquisition module, a second image acquisition and processing module, a second beam emitting end and a second gimbal.

The transmitting antenna is configured to transmit a terahertz signal, and the receiving antenna is configured to receive the terahertz signal.

The signal processing module is configured to process the received terahertz signal and input the received terahertz signal to the second control module.

The first communication module and the second communication module are configured for information interaction between the transmitter and the receiver.

The first information acquisition module is configured to acquire longitude and latitude information and inertial navigation information of the transmitter, and the second information acquisition module is configured to acquire longitude and latitude information and inertial navigation information of the receiver.

The first image acquisition and processing module is configured to acquire a receiver image and identify a centroid of a light beam emitted by the second beam emitting end, and the second image acquisition and processing module is configured to acquire a transmitter image and identify a centroid of a light beam emitted by the first beam emitting end.

The first control module is configured to receive and process information input by the first communication module, the first information acquisition module and the first image acquisition and processing module and issue a control instruction to the first gimbal.

The second control module is configured to receive and process information input by the signal processing module, the second communication module, the second information acquisition module, and the second image acquisition and processing module and issue a control instruction to the second gimbal.

Both the first image acquisition and processing module and the second image acquisition and processing module include an image acquisition unit and an image processing unit. The image acquisition unit is a camera. The image processing unit is image processing board card RK3588 configured to process an image through binarization and Hough circle detection algorithm.

The signal processing module includes a radio frequency logarithmic detection unit and an analog-to-digital conversion unit.

Both the first communication module and the second communication module are Lora modules.

Both the first information acquisition module and the second information acquisition module include a Global Positioning System (GPS) unit and an Inertial Measurement Unit (IMU).

Both the first gimbal and the second gimbal are servo turntables.

Both the first control module and the second control module are control board cards STMicroelectronics (STM) 32.

Both the first beam emitting end and the second beam emitting end are laser emitters.

The radio frequency logarithmic detection unit is connected to intermediate frequency output of the receiver by means of a radio frequency cable. The analog-to-digital conversion unit is connected to the radio frequency detection module by means of a radio frequency cable and connected to STM32 by means of a 14PIN, such that precise alignment guided by the received power of the terahertz communication system is completed. The camera is connected to RK3588, and the RK3588 is in serial port communication with STM32. Moreover, the RK3588 acquires an image by means of the camera, identifies a centroid of the laser beam, and transmits position information of the centroid of the laser beam to an STM32 main control board through serial port. Further, STM32 main control board transmits a control instructions to the gimbal through a CAN interface, such that real-time alignment of a central axis of a transceiver system for terahertz communication is achieved.

The double beacons mainly involve a laser beacon and a terahertz power beacon. A laser beacon of an input video stream can be recognized through an image recognition algorithm of RK3588, and position information of a center of the laser beacon in an image is acquired. Circle detection is carried out through Hough transform after image binarization. The terahertz power beacon is a received power value detected by connecting a radio frequency detection module to an analog-digital conversion module. Alignment of a transceiver system for terahertz communication can be accurately achieved by means of the terahertz power beacon, and accurate position reference coordinates are provided for the laser beacon. During real-time tracking and aiming of the laser beacon, whether the tracking and aiming are accurate can be determined by comparing a theoretical value obtained through a terahertz channel estimation algorithm with the terahertz beacon.

Another example relates to a dual-beacon electro-optical fusion terahertz communication tracking and aiming method, which is implemented by using the dual-beacon electro-optical fusion terahertz communication tracking and aiming system. The tracking and aiming steps are as follows:

S1: Acquire longitude and latitude information and inertial navigation information of a transmitter by means of a first information acquisition module, input the longitude and latitude information and the inertial navigation information to a first control module, acquire longitude and latitude information and inertial navigation information of a receiver by means of a second information acquisition module, and input the longitude and latitude information and the inertial navigation information to a second control module.

S2: Use interaction between a first communication module and a second communication module, transmit the longitude and latitude information of the transmitter to the receiver, and transmit the longitude and latitude information of the receiver to the transmitter; combine, by the first control module, the longitude and latitude information of the transmitter and the receiver, compute a north angle of the receiver relative to the transmitter and the inertial navigation information of the transmitter, and control a first gimbal to act; combine, by the second control module, the longitude and latitude information of the transmitter and the receiver, compute a north angle of the transmitter relative to the receiver and the inertial navigation information of the receiver, and control a second gimbal to act; and complete rapid alignment.

S3: Control the second gimbal to act by the receiver by means of the second control module, acquire a terahertz signal power value input by a signal processing module, and control the second gimbal to rotate to a position at which a maximum power value is achieved; and control the first gimbal to act by the transmitter by means of the first control module, acquire a terahertz signal power value recorded by the receiver by means of the first communication module, control the first gimbal to rotate to a position at which a maximum power value is achieved, take a terahertz signal power value recorded by the receiver at this time as maximum power, and complete preliminary alignment. The step includes:

control, by the second control module, the second gimbal to move for transverse scanning, record a terahertz signal power value at each position, complete the scanning, and move the second gimbal to a position at which a maximum power value is achieved; control, by the second control module, the second gimbal to move for longitudinal scanning, and move the second gimbal to a position at which a maximum power value is achieved; control, by the first control module, the first gimbal to move for transverse scanning, transmit, by the second control module, an acquired power value to the first control module, record, by the first control module, a terahertz signal power value at each position, and control the first gimbal to move to a position at which a maximum power value is achieved; and control, by the first control module, the first gimbal to move for longitudinal scanning, moving the first gimbal to a position at which a maximum power value is achieved, and take a power value acquired by the second control module at this time as a maximum power value.

S4: Acquire and process a receiver image by the transmitter by means of a first image acquisition and processing module after adjustment in S3, acquire coordinates of a centroid of a light beam emitted by a second beam emitting end as first tracking and aiming reference coordinates, acquire and process a transmitter image by the receiver by means of a second image acquisition and processing module, and acquire coordinates of a centroid of a light beam emitted by a first beam emitting end as second tracking and aiming reference coordinates. The step includes:

complete the preliminary alignment by the receiver and the transmitter after S3, acquire a frame of receiver image by the transmitter by means of the first image acquisition and processing module, binarize the frame of receiver image, set a gray value of a pixel point on the frame of receiver image as 0 or 255 based on a set threshold to highlight an outline of a light spot of a laser beam, carry out a Hough circle detection algorithm on a binarized image to acquire a centroid and the outline of the light spot of the laser beam emitted by the second beam emitting end, and take coordinates of a identified centroid as the first tracking and aiming reference coordinates; and acquire the second tracking and aiming reference coordinates by the receiver.

S5: Acquire and process the receiver image in real time by the first image acquisition and processing module during real-time tracking of the transmitter and the receiver, acquire the coordinates of the centroid of the light beam emitted by the second beam emitting end, compare the coordinates of the centroid of the light beam emitted by the second beam emitting end with the first tracking and aiming reference coordinates to acquire a first offset, acquire and process the transmitter image in real time by the second image acquisition and processing module, acquire the coordinates of the centroid of the light beam emitted by the first beam emitting end, compare the coordinates of the centroid of the light beam emitted by the first beam emitting end with the second tracking and aiming reference coordinates, and acquire a second offset.

S6: Based on S5, acquire, by the second control module, the terahertz signal power value input by the signal processing module, compare the power value with the maximum power to acquire a power reduction condition, determine a first rotation angle and a second rotation angle by combine the power reduction condition with the inertial navigation information of the transmitter and the inertial navigation information of the receiver. The step includes:

map an antenna pattern by the transmitter based on a designed antenna by taking a position at which maximum power is achieved as a center, determine a real-time power reduction gradient direction by the first control module according to the inertial navigation information of the transmitter and the receiver, determine a movement distance according to reduced power, and determine the first rotation angle comprehensively; and determine the second rotation angle by the receiver.

S7: Control, by the first control module, the first gimbal to rotate based on the first offset and the first rotation angle, and control, by the second control module, the second gimbal to rotate based on the second offset and the second rotation angle until the terahertz signal power value acquired by the receiver is equal to a maximum power value.

A detailed implementation process is as follows:

S1': Acquire longitude and latitude information of a current terahertz communication system by a GPS module, and transmit the longitude and latitude information to control board card STM32 through a serial port.

S2': Exchange the longitude and latitude information of the receiver and the transmitter of the terahertz communication system by means of a Lora module, compute a north angle of a geographical position of the other system relative to the terahertz communication system, acquire attitude information of the system by means of an IMU module, and control a servo turntable to preliminarily turn to the other system.

S3': Complete rapid alignment of the receiver and the transmitter of the terahertz communication system by means of terahertz intermediate frequency signal output power received by the receiver of the terahertz communication system.

The steps are as follows: a terahertz signal is doubled down by a frequency multiplier, then input into the analog-to-digital conversion module through a radio frequency logarithmic detection module, and converted into a digital signal by the analog-to-digital conversion module, the digital signal is input into an embedded control board card to acquire a terahertz signal power value. Carry out transverse scanning by the receiver, record a terahertz signal power value at each position, complete scanning, and control the turntable to move to a position at which a maximum power value is achieved. Complete scanning, and carry out longitudinal scanning through a method the same as that for the transverse scanning. Carry out transverse scanning by the transmitter, transmit the power value acquired by the receiver to a data processing board card of the transmitter by means of the Lora module, record a terahertz signal power value at each position, and control the turntable to move to a position at which a maximum power value is achieved. Complete scanning, carry out longitudinal scanning through a method the same as the method for the transverse scanning, and take a power value acquired at the receiver as maximum power.

S4': Complete preliminary alignment by the receiver and the transmitter of the terahertz communication system after S3, acquire a frame of image of the camera, binarize the frame of image, set a gray values of a pixel point on the frame of image as 0 or 255 based on a set threshold to highlight an outline of a light spot of the laser beam. Carry out a Hough circle detection algorithm on a binarized image to acquire a centroid and the outline of the light spot of the laser beam. Take coordinates of the centroid identified above as the tracking and aiming reference coordinates.

S5': During real-time tracking of the transmitter and the receiver, acquire and process a receiver image in real time by transmitter STM32 to acquire coordinates of a centroid of a laser beam emitted by a laser emitter at the receiver, compare the coordinates with tracking and aiming reference coordinates of the transmitter to acquire a first offset; and acquire and process a transmitter image in real time by receiver STM32 to acquire coordinates of a centroid of a laser beam emitted by a laser emitter at the transmitter, compare the coordinates with tracking and aiming reference coordinates of the receiver to acquire a second offset.

S6': Base on S5, acquire, by receiver STM32, a terahertz signal power value input by the signal processing module, compare the power value with maximum power to acquire a power reduction condition; map a transmitting antenna pattern by the transmitter by taking a position at which maximum power is achieved as a center, determine a real-time power reduction gradient direction by transmitter STM32 based on inertial navigation information of the transmitter and the receiver, determine a movement distance based on reduced power, and determine a first rotation angle comprehensively; and determine a second rotation angle by receiver STM32.

S7': Control, by transmitter STM32, the first gimbal to rotate based on the first offset and the first rotation angle, and control, by receiver STM32, the second gimbal to rotate based on the second offset and the second rotation angle until a terahertz signal power value acquired by receiver STM32 is equal to a maximum power value.

Figure 2:
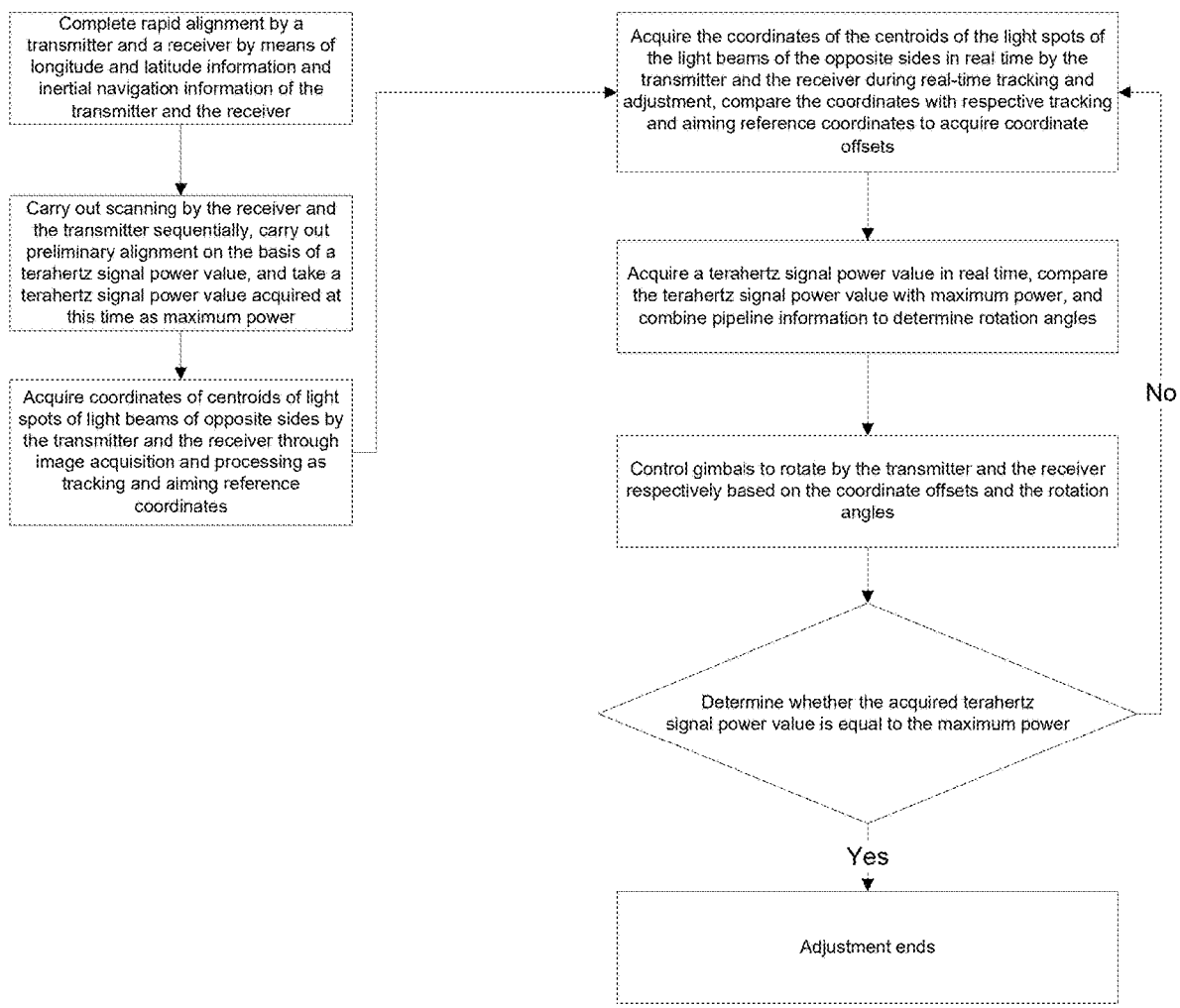
FIG. 2 is a flow diagram of a dual-beacon electro-optical fusion terahertz communication tracking and aiming method according to some embodiments of the present disclosure.

The embodiment of the disclosure will be described in detail below in combination with FIG. 2. As shown in FIG. 2, a detailed implementation process is as follows: Complete rapid alignment by a transmitter and a receiver by means of longitude and latitude information and inertial navigation information of the transmitter and the receiver. Carry out scanning by the receiver and the transmitter sequentially, carry out preliminary alignment on the basis of a terahertz signal power value, and take a terahertz signal power value acquired at this time as maximum power. Acquire coordinates of centroids of light spots of light beams of opposite sides by the transmitter and the receiver through image acquisition and processing as tracking and aiming reference coordinates. Acquire the coordinates of the centroids of the light spots of the light beams of the opposite sides in real time by the transmitter and the receiver during real-time tracking and adjustment, compare the coordinates with respective tracking and aiming reference coordinates to acquire coordinate offsets. Acquire a terahertz signal power value in real time, compare the terahertz signal power value with maximum power, and combine pipeline information to determine rotation angles. Control gimbals to rotate by the transmitter and the receiver respectively based on the coordinate offsets and the rotation angles. When the gimbals are controlled to rotate, determine whether the acquired terahertz signal power value is equal to the maximum power. When the acquired terahertz signal power value is equal to the maximum power, adjustment ends. When the acquired terahertz signal power value is not equal to the maximum power, acquire the coordinates of the centroids of the light spots of the light beams of the opposite sides in real time by the transmitter and the receiver during real-time tracking and adjustment, compare the coordinates with respective tracking and aiming reference coordinates to acquire coordinate offsets until the acquired terahertz signal power value is equal to the maximum power.

The above examples merely illustrate particular embodiments of the disclosure and are described relatively specifically and in detail, but cannot be construed as limiting the scope of protection of the disclosure. It should be noted that those of ordinary skill in the art can make several variations and improvements without departing from the concept of the technical solution of the disclosure. The variations and improvements should all fall within the scope of protection of the disclosure.

What is claimed is:

1. A dual-beacon electro-optical fusion terahertz communication tracking and aiming method, using a dual-beacon electro-optical fusion terahertz communication tracking and aiming system, the system comprising a transmitter and a receiver, the transmitter comprises a transmitting antenna, a first control module, a first communication module, a first information acquisition module, a first image acquisition and processing module, a first beam emitting end and a first gimbal; the receiver comprises a receiving antenna, a signal processing module, a second control module, a second communication module, a second information acquisition module, a second image acquisition and processing module, a second beam emitting end and a second gimbal, wherein the method comprises:

S1: acquiring longitude and latitude information and inertial navigation information of a transmitter by means of a first information acquisition module, inputting the longitude and latitude information and the inertial navigation information to a first control module, acquiring longitude and latitude information and inertial navigation information of a receiver by means of a second information acquisition module, and inputting the longitude and latitude information and the inertial navigation information to a second control module;

S2: using interaction between a first communication module and a second communication module, transmitting the longitude and latitude information of the transmitter to the receiver, and transmitting the longitude and latitude information of the receiver to the transmitter; combining, by the first control module, the longitude and latitude information of the transmitter and the receiver and the inertial navigation information of the transmitter, and controlling a first gimbal to act; combining, by the second control module, the longitude and latitude information of the transmitter and the receiver and the inertial navigation information of the receiver, and controlling a second gimbal to act; and completing rapid alignment;

S3: controlling the second gimbal to act by the receiver by means of the second control module, acquiring a terahertz signal power value input by a signal processing module, and controlling the second gimbal to rotate to a position at which a maximum power value is achieved; and controlling the first gimbal to act by the transmitter by means of the first control module, acquiring a terahertz signal power value recorded by the receiver by means of the first communication module, controlling the first gimbal to rotate to a position at which a maximum power value is achieved, taking a terahertz signal power value recorded by the receiver at this time as maximum power, and completing preliminary alignment;

S4: acquiring and processing a receiver image by the transmitter by means of a first image acquisition and processing module after adjustment in S3, acquiring coordinates of a centroid of a light beam emitted by a second beam emitting end as first tracking and aiming reference coordinates, acquiring and processing a transmitter image by the receiver by means of a second image acquisition and processing module, and acquiring coordinates of a centroid of a light beam emitted by a first beam emitting end as second tracking and aiming reference coordinates;

S5: acquiring and processing the receiver image in real time by the first image acquisition and processing module during real-time tracking of the transmitter and the receiver, acquiring coordinates of the centroid of the light beam emitted by the second beam emitting end, comparing the coordinates of the centroid of the light beam emitted by the second beam emitting end with the first tracking and aiming reference coordinates to acquire a first offset, acquiring and processing the transmitter image in real time by the second image acquisition and processing module, acquiring coordinates of the centroid of the light beam emitted by the first beam emitting end, comparing the coordinates of the centroid of the light beam emitted by the first beam emitting end with the second tracking and aiming reference coordinates to acquire a second offset;

S6: based on S5, acquiring, by the second control module, the terahertz signal power value input by the signal processing module, comparing the power value with the maximum power to acquire a power reduction condition, determining a first rotation angle and a second rotation angle by combining the power reduction condition with the inertial navigation information of the transmitter and the inertial navigation information of the receiver; and S7: controlling, by the first control module, the first gimbal to rotate based on the first offset and the first rotation angle, and controlling, by the second control module, the second gimbal to rotate based on the second offset and the second rotation angle until the terahertz signal power value acquired by the receiver is equal to a maximum power value.

2. The dual-beacon electro-optical fusion terahertz communication tracking and aiming method as claimed in claim 1, wherein S3 comprises:

controlling, by the second control module, the second gimbal to move for transverse scanning, recording a terahertz signal power value at each position, completing the scanning, and moving the second gimbal to a position at which a maximum power value is achieved; controlling, by the second control module, the second gimbal to move for longitudinal scanning, and moving the second gimbal to a position at which a maximum power value is achieved;

controlling, by the first control module, the first gimbal to move for transverse scanning, transmitting, by the second control module, an acquired power value to the first control module, recording, by the first control module, a terahertz signal power value at each position, and controlling the first gimbal to move to a position at which a maximum power value is achieved;

controlling, by the first control module, the first gimbal to move for longitudinal scanning, moving the first gimbal to a position at which a maximum power value is achieved, and taking a power value acquired by the second control module at this time as a maximum power value.

3. The dual-beacon electro-optical fusion terahertz communication tracking and aiming method as claimed in claim 1, wherein S4 comprises:

completing the preliminary alignment by the receiver and the transmitter after S3, acquiring a frame of receiver image by the transmitter by means of the first image acquisition and processing module, binarizing the frame of receiver image, setting a gray value of a pixel point on the frame of receiver image as 0 or 255 based on a set threshold to highlight an outline of a light spot of a laser beam, carrying out a Hough circle detection algorithm on a binarized image to acquire a centroid and the outline of the light spot of the laser beam emitted by the second beam emitting end, and taking coordinates of a identified centroid as the first tracking and aiming reference coordinates; and acquiring the second tracking and aiming reference coordinates by the receiver.

4. The dual-beacon electro-optical fusion terahertz communication tracking and aiming method as claimed in claim 1, wherein S6 comprises:

mapping an antenna pattern by the transmitter by taking a position at which maximum power is achieved as a center, determining a real-time power reduction gradient direction by the first control module based on the inertial navigation information of the transmitter and the receiver, determining a movement distance based on reduced power, and determining the first rotation angle comprehensively; and determining the second rotation angle by the receiver.

5. A dual-beacon electro-optical fusion terahertz communication tracking and aiming system, the system, configured to execute the dual-beacon electro-optical fusion terahertz communication tracking and aiming method as claimed in claim 1, the system comprising a transmitter and a receiver, the transmitter comprises a transmitting antenna, a first control module, a first communication module, a first information acquisition module, a first image acquisition and processing module, a first beam emitting end and a first gimbal; the receiver comprises a receiving antenna, a signal processing module, a second control module, a second communication module, a second information acquisition module, a second image acquisition and processing module, a second beam emitting end and a second gimbal;

the transmitting antenna, configured to transmit a terahertz signal, and the receiving antenna, configured to receive the terahertz signal;

the signal processing module, configured to process the received terahertz signal and input the received terahertz signal to the second control module;

the first communication module and the second communication module, configured for information interaction between the transmitter and the receiver;

the first information acquisition module, configured to acquire longitude and latitude information and inertial navigation information of the transmitter, and the second information acquisition module, configured to acquire longitude and latitude information and inertial navigation information of the receiver;

the first image acquisition and processing module, configured to acquire a receiver image and identify a centroid of a light beam emitted by the second beam emitting end, and the second image acquisition and processing module, configured to acquire a transmitter image and identify a centroid of a light beam emitted by the first beam emitting end;

the first control module, configured to receive and process information input by the first communication module, the first information acquisition module and the first image acquisition and processing module and issue a control instruction to the first gimbal; and the second control module, configured to receive and process information input by the signal processing module, the second communication module, the second information acquisition module, and the second image acquisition and processing module and issue a control instruction to the second gimbal.

6. The dual-beacon electro-optical fusion terahertz communication tracking and aiming system as claimed in claim 5, wherein both the first image acquisition and processing module and the second image acquisition and processing module comprise an image acquisition unit and an image processing unit, and the image processing unit, configured to process an image through binarization and Hough circle detection algorithm.

7. The dual-beacon electro-optical fusion terahertz communication tracking and aiming system as claimed in claim 5, wherein the signal processing module comprises a radio frequency logarithmic detection unit and an analog-to-digital conversion unit, wherein the radio frequency logarithmic detection unit and the analog-to-digital conversion unit are connected to each other.

8. The dual-beacon electro-optical fusion terahertz communication tracking and aiming system as claimed in claim 7, wherein the radio frequency logarithmic detection unit is connected to intermediate frequency output of the receiver by means of a radio frequency cable, and the analog-to-digital conversion unit is connected to the radio frequency detection module by means of a radio frequency cable and is connected to the second control module.

9. The dual-beacon electro-optical fusion terahertz communication tracking and aiming system as claimed in claim 5, wherein both the first communication module and the second communication module are Lora modules.

10. The dual-beacon electro-optical fusion terahertz communication tracking and aiming system as claimed in claim 5, wherein both the first information acquisition module and the second information acquisition module comprise a Global Positioning System (GPS) unit and an Inertial Measurement Unit (IMU).

11. The dual-beacon electro-optical fusion terahertz communication tracking and aiming system as claimed in claim 5, wherein both the first gimbal and the second gimbal are servo turntables.

12. The dual-beacon electro-optical fusion terahertz communication tracking and aiming system as claimed in claim 5, wherein both the first beam emitting end and the second beam emitting end are laser emitters.

13. The dual-beacon electro-optical fusion terahertz communication tracking and aiming system as claimed in claim 5, wherein the first control module, configured to control the first gimbal to act and the second control module, configured to control the second gimbal to act, such that rapid alignment, preliminary alignment, and tracking and aiming of the transmitter and the receiver are sequentially achieved.

14. The dual-beacon electro-optical fusion terahertz communication tracking and aiming system as claimed in claim 5, wherein the first image acquisition and processing module comprises a camera and RK3588, the camera is connected to RK3588, and the RK3588 is in serial port communication with the first control module; the RK3588, configured to acquire an image by means of the camera, identify a centroid of a laser beam, and transmit position information of the centroid of the laser beam to the first control module through a serial port; and the first control module transmits a control instruction to the first gimbal through a Controller Area Network (CAN) interface to control the first gimbal to act.

15. A dual-beacon electro-optical fusion terahertz communication tracking and aiming method, wherein the method comprising:

carrying out rapid alignment of a transmitter and a receiver by means of longitude and latitude information and inertial navigation information of the transmitter and the receiver, carrying out preliminary alignment of the transmitter and the receiver according to a terahertz signal power value received by the receiver, taking terahertz signal power when the preliminary alignment is completed as maximum power, transmitting light beams by the transmitter and the receiver simultaneously, and determining first tracking and aiming reference coordinates and second tracking and aiming reference coordinates by the transmitter and the receiver by means of centroids of the light beams;

determining a first offset by the transmitter based on real-time data and maximum power during real-time tracking and aiming, determining a first rotation angle based on the real-time data and the first tracking and aiming reference coordinates, adjusting a direction based on the first offset and the first rotation angle, determining a second offset by the receiver based on the real-time data and the maximum power, determining a second rotation angle based on the real-time data and the second tracking and aiming reference coordinates, and adjusting a direction based on the second offset and the second rotation angle.

16. The dual-beacon electro-optical fusion terahertz communication tracking and aiming method as claimed in claim 15, wherein the preliminary alignment comprises:

moving the receiver for transverse scanning, recording a terahertz signal power value at each position, and moving, after the scanning is completed, the receiver to a position, at which a maximum power value is achieved, in a transverse direction; moving the receiver for longitudinal scanning, and moving the receiver to a position, at which a maximum power value is achieved, in a longitudinal direction; carrying out transverse scanning by the transmitter, recording a terahertz signal power value at each position, and moving the transmitter to a position, at which a maximum power value is achieved, in a transverse direction; moving the transmitter for longitudinal scanning, and moving the transmitter to a position, at which a maximum power value is achieved, in a longitudinal direction; and taking a power value acquired by the receiver at this time as a maximum power value.

17. The dual-beacon electro-optical fusion terahertz communication tracking and aiming method as claimed in as claimed in claim 15, wherein the method comprising:

acquiring a frame of receiver image by the transmitter, binarizing the frame of receiver image, setting a gray value of a pixel point on the frame of receiver image as 0 or 255 based on a set threshold to highlight an outline of a light spot of a light beam, carrying out a Hough circle detection algorithm on a binarized image to acquire a centroid and the outline of the light spot of the light beam emitted by the receiver, and taking coordinates of a identified centroid as the first tracking and aiming reference coordinates; and acquiring the second tracking and aiming reference coordinates by the receiver.

18. The dual-beacon electro-optical fusion terahertz communication tracking and aiming method as claimed in as claimed in as claimed in claim 15, wherein acquiring the first offset and the second offset comprises:

acquiring and processing, by the transmitter, a receiver image in real time to acquire coordinates of the centroid of the light beam emitted by the receiver, comparing the coordinates with the first tracking and aiming reference coordinates to acquire the first offset, acquiring and processing, by the receiver, a transmitter image in real time to acquire coordinates of the centroid of the light beam emitted by the first beam emitting end, comparing the coordinates with the second tracking and aiming reference coordinates to acquire the second offset.

19. The dual-beacon electro-optical fusion terahertz communication tracking and aiming method as claimed in as claimed in as claimed in claim 15, wherein acquiring the first rotation angle and the second rotation angle comprises:

mapping an antenna pattern by the transmitter by taking a position at which maximum power is achieved as a center, determining a real-time power reduction gradient direction based on the inertial navigation information of the transmitter and the receiver, determining a movement distance based on reduced power, and determining the first rotation angle comprehensively;

mapping an antenna pattern by the receiver by taking a position at which maximum power is achieved as a center, determining a real-time power reduction gradient direction based on the inertial navigation information of the transmitter and the receiver, determining a movement distance based on reduced power, and determining the second rotation angle comprehensively.

20. The dual-beacon electro-optical fusion terahertz communication tracking and aiming method as claimed in as claimed in as claimed in claim 15, wherein rapid alignment comprises:

acquiring, by the receiver, the longitude and latitude information of the transmitter, acquiring, by the transmitter, the longitude and latitude information of the receiver, acting, by the transmitter, based on the longitude and latitude information of the transmitter and the receiver and the inertial navigation information of the transmitter, acting, by the receiver, according to the longitude and latitude information of the transmitter and the receiver and the inertial navigation information of the receiver, and completing the rapid alignment.

* * * * *